United States Patent

Crivello

[15] 3,678,081
[45] July 18, 1972

[54] OXIDATION OF HYDROXYLATED AROMATIC COMPOSITIONS

[72] Inventor: James V. Crivello, Mechanicville, N.Y.

[73] Assignee: General Electric Company

[22] Filed: Oct. 23, 1969

[21] Appl. No.: 868,918

[52] U.S. Cl.........................260/396 R, 260/378, 260/396 N, 260/465 F, 260/467, 260/520, 260/545 R, 260/613 R, 260/620
[51] Int. Cl. ................C07c 41/10, C07c 43/22, C07c 49/64
[58] Field of Search....................260/396, 613 R, 465 F, 520

[56] References Cited

UNITED STATES PATENTS 2,573,136  10/1951  Gleim et al. ...........................260/396
2,657,222  10/1953  Allen et al. ............................260/396

*Primary Examiner*—Vivian Garner
*Attorney*—Paul A. Frank, Charles T. Watts, William A. Teoli, Joseph T. Cohen, Frank L. Neuhauser, Oscar B. Waddell and Joseph B. Forman

[57] ABSTRACT

Hydroxylated aromatic organic compositions are readily converted to the oxidized state by treatment with a mixture comprising a perfluoro saturated aliphatic acid anhydride of from four to eight carbon atoms and an oxidizing agent of either metal nitrates or ammonium nitrate.

11 Claims, No Drawings

OXIDATION OF HYDROXYLATED AROMATIC COMPOSITIONS

This invention is concerned with a process for oxidizing hydroxylated aromatic ring compositions. More particularly, the invention is concerned with a process for oxidizing compositions containing aromatic carbocyclic radicals having attached thereto a benzenoid hydroxyl radical, which process comprises treating such a hydroxylated aromatic compositions (which term is intended to include polyhydroxylated compositions) with a mixture of ingredients comprising a perfluoro saturated aliphatic acid anhydride of from 4 to 8 carbon atoms and an oxidant selected from the class consisting of metal nitrates and ammonium nitrate.

The oxidation of organic compositions, particularly the oxidation of aromatic compositions, is well known in the art and is an important industrial process for making many organic chemicals. As a result of the oxidation reaction, a wide variety of products are obtained depending on the compositions being oxidized, the oxidant, and the oxidation conditions. One of the more important oxidation reactions involves the oxidation of phenols and substituted phenols to quinones. A particularly important oxidation process is that involving the preparation of o-chloranil and p-chloranil. o-Chloranil is a powerful oxidant and has been used in the oxidation and dehydrogenation of a large number of organic compounds. Generally, this compound has been prepared in the past by either of two procedures (1) nitric acid oxidation of tetrachlorocatechol as shown in articles by C. L. Jackson and R. D. MacLaurin, J. Am. Chem. Soc. 37, 7 (1907) and by C. L. Jackson and P. W. Carleton, ibid., 39, 493 (1908) and by the fuming nitric acid oxidation of pentachlorophenol as shown by W. H. Chang, J. Org. Chem., 27, 2921 (1962).

Whereas the above-identified processes give yields of the o-chloranil of close to 70 percent, it would be desirable to improve these yields still further, while at the same time overcoming a number of undesirable factors associated with the prior art methods for making this composition including undesirably large amounts of by-products and difficulties associated with the isolation of the desired reaction product. Unexpectedly, I have discovered that many of the difficulties associated with the prior oxidation of aromatic compounds, and particularly with respect to the preparation of the commercially attractive materials, o-chloranil and p-chloranil, can be readily obviated by employing as the oxidation medium for the hydroxylated aromatic composition, a mixture of ingredients comprising a perfluoro saturated aliphatic acid anhydride of from four to eight carbon atoms and an oxidizing agent selected from the class of either a metal nitrate or ammonium nitrate. Obviously mixtures of the anhydrides and of the oxidizing agents may be used without departing from the scope of the invention.

More particularly, I have found that by employing a mixture of the perfluorinated acid anhydride and the nitrate for the oxidation of hydroxylated aromatic compositions, greater yields under comparable conditions are obtained in most instances then has heretofore been possible, while at the same time realizing a reduction in the by-product yield of the reaction mixture. Moreover, the desired product can be readily isolated from the reaction mixture with a minimum of processing effort. Additionally, the oxidants used in my process, namely, inorganic nitrates and ammonium nitrate, are relatively inexpensive and readily available in a high state of purity. Although the perfluoroaliphatic acid anhydride may be consumed during the reaction and appears both as the fluorinated acid and salts of the fluorinated acid, it can readily be regenerated by treating with fuming sulfuric acid to obtain again the perfluorinated aliphatic acid anhydride. Basically, my procedure is quite simple involving readily available starting materials and conventional equipment for making the desired oxidized products. Furthermore, the oxidizing agent (i.e., the nitrate) can be measured out precisely so that control over the reaction can be conveniently maintained. Moreover, when employing the lower perfluoro saturated aliphatic acid anhydrides, they can readily be removed from the reaction zone after the reaction is completed with the aid of a rotary evaporator or by low temperature distillation. Finally, the yields of the desired products are exceptionally good with little or no interference due to the presence of undesirable by-products.

The formation of oxidized products resulting from the reaction of the mixture of perfluorinated anhydride and the nitrate with the hydroxylated composition can lead to at least three different types of oxidation products. This result will generally depend on the presence or the type of group or groups nuclearly substituted on the aromatic ring in positions ortho or para to the hydroxyl group. Thus, it is possible to obtain diphenoquinones as a result of carbon-carbon coupling. In other instances, my oxidation reaction results in carbon-oxygen coupling.

The tendency towards carbon-carbon coupling usually occurs when the position on the aromatic nucleus immediately adjacent to the hydroxy group is occupied by a bulky substituent. In those instances, generally one obtains oxidized products comprising a diphenoquinone. For example, when the two ortho positions are blocked with bulky substitutents, such as in the case of 2,6-di-t-butylphenol, carrying out the oxidation process described above results in carbon-carbon coupling exclusively, to give the corresponding 3,3',5,5'-tetra-t-butyl diphenoquinone.

On the other hand, when less sterically hindered phenols are oxidized, for example, phenol itself, or in a specific instance, when a phenoxy phenol is employed, and there are no bulky sterically hindering groups adjacent the hydroxyl group, one obtains carbon-oxygen coupling. For instance, by subjecting phenol to oxidation in accordance with my claimed process, one would obtain phenoxy phenol.

The formation of products in the oxidation of specifically phenols may be explained by the following mechanism. In the first step, the inorganic nitrate reacts with the perfluoro aliphatic acid anhydride to generate a salt of the corresponding acid and also to form a perfluoro aliphatic acid nitrate. Taking as an example an inorganic nitrate identified as MNO₃ (where M is a monovalent inorganic ion, e.g., sodium) and taking trifluoroacetic anhydride as an example of a perfluorinated acid anhydride, the following steps generally are believed to take place:

$(CF_3CO)_2O + MNO_3 \rightarrow CF_3CO-ONO_2 + CF_3COOM$

Thereafter, reaction takes place between the phenol and the mixed anhydride to generate a phenol nitrate in accordance with the following equation where X is a t-butyl group

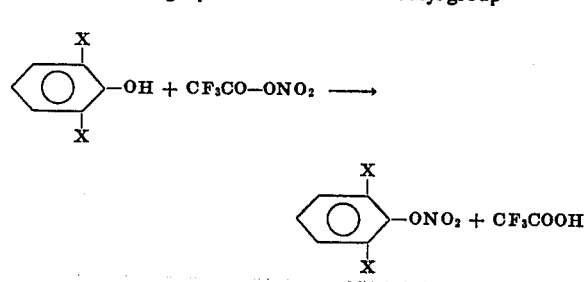

Since aromatic nitrate esters are highly unstable, they undergo rapid reaction to generate the phenoxy radical and a nitrogen dioxide radical in accordance with the following equation:

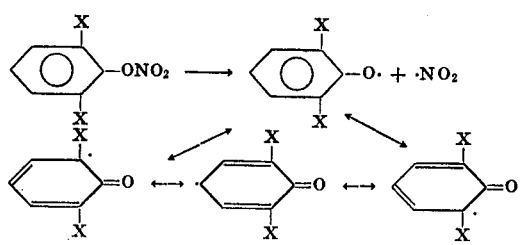

Two molecules of the quinone can then react by means of a carbon-carbon coupling as shown by the following equation:

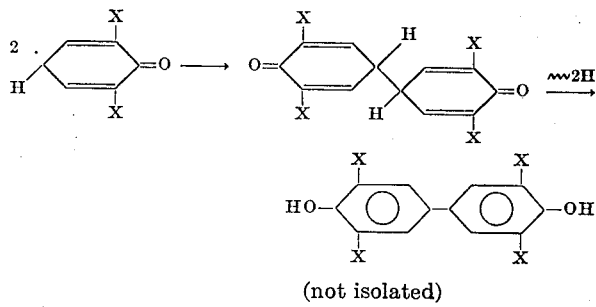

(not isolated)

Under the same conditions, for instance, the dihydroxy diphenyl described above can be oxidized with the aforementioned trifluoro acetyl nitrate to give the corresponding diphenoquinone having the formula

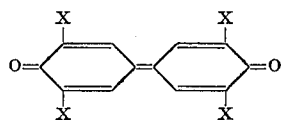

Alternatively, when less sterically hindered phenols are oxidized, for instance, 2,6-dimethylphenol, the corresponding phenoxy phenol is formed being the product of carbon-oxygen coupling. These phenoxy phenols can further be treated under special oxidation conditions as, for instance, described in Kwiatek patent U.S. Pat. No. 3,134,753 to give high molecular weight polymers.

In any event, it should be recognized that whatever the hydroxylated composition employed and regardless of the kind of substitution, if any, adjacent the hydroxyl group on the aryl nucleus, there will be one form or another of oxidation reaction going on depending, as pointed out, on the presence or absence of bulky groups which will determine to a considerable extent whether a quinone structure will be formed, whether carbon-carbon coupling will occur, or whether carbon-oxygen coupling will occur. My oxidation process is intended to include all of these different types of oxidation reactions.

It should, further, be recognized that after oxidation of the hydroxylated aromatic composition to form the above-described oxidation products, further treatment with the mixture of the perfluoro saturated aliphatic acid anhydride and the inorganic nitrate, where the mixture of nitrate and anhydride is in a molar excess of that required to give the oxidation products, may ultimately result in nitration of the aromatic composition where there is present at least one nuclearly-bonded hydrogen. The nitration of aromatic organic compositions containing benzenoid-substituted hydrogen with the aforesaid mixture of anhydride and inorganic nitrate is more particularly disclosed and claimed in my copending application, Ser. No. 868,917, filed concurrently herewith and assigned to the same assignee as the present invention.

Among the perfluoro saturated aliphatic acid anhydrides of from four to eight carbon atoms which may be employed in the practice of the present invention may be mentioned, for instance, trifluoroacetic anhydride (identified as TFAA), pentafluoro propionic acid anhydride, septafluoro butyric acid anhydride, the mixed anhydride obtained from trifluoro acetic acid and pentafluoro propionic acid, etc.

The metallic nitrate (in addition to the ammonium nitrate) which is employed in the practice of the present invention advantageously has the general formula

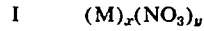

where M is a metal atom and the valences $x$ and $y$ of the metal and of the nitrate group can be varied depending upon the particular metal employed; accordingly, the number of nitrate groups in the metal nitrate will also be varied depending on the valence of the metal atom. Among such metal nitrates which may be employed may be mentioned, for instance, sodium nitrate, potassium nitrate, copper nitrate including the cupric and cuprous forms, cadmium nitrate, lead nitrate, silver nitrate, zirconium nitrate, chromium nitrate, etc. Various metal salts containing varying molecules of water of hydration are included within the term "metal nitrate." It is preferred that the nitrate employed be either an alkali-metal nitrate such as sodium nitrate or ammonium nitrate because of their inexpense, ready availability, purity and the ability to readily isolate and remove from the reaction mixture, any salts derived from the nitrate.

The hydroxylated (non-polymeric) aromatic compounds which can be oxidized in accordance with the practice of the present invention are not critical and can be varied widely. Among the simple hydroxylated aromatic compositions (containing one or more nuclearly substituted hydroxyl groups) which may be employed in the practice of the present invention may be mentioned, for instance, hydroxylated aromatic hydrocarbons (e.g., phenol, naphthol, anthrol, hydroxybiphenyl, hydroxyterphenyl, hydroquinone, etc.); aliphatic-substituted aromatic hydrocarbons (e.g., p-cresol, m-cresol, 2,6-dimethylphenol, 2-ethylphenol, cavracrol, thymol, 4-butyl-2,6-dimethylphenol, β-methyl-α-naphthol, 2,6-dihexylphenol, 4,4'-dihydroxy diphenyloxide, 2-hydroxystyrene, 4-allyl phenol, ethylhydroquinone, etc.); halogenated hydroxylated aromatic compounds and halogenated aliphatic-substituted hydroxylated aromatic compounds (e.g., 4-chlorophenol, 2,6-dichlorophenyl, 2,5-dichlorophenol, 2,3,5-tribromophenol, 2,3,5,6-tetrachlorophenol, pentachlorophenol, 2,4,6-trifluorophenol, 2,3,6-triiodocresol, 2,3-dichloro-α-naphthol, 2,4-dichloro-3-methylphenol, dibromoanthrol, 3,3',5,5'-tetrachloro-4,4'-dihydroxy diphenylketone, etc.);aliphatic ethers of hydroxylated aromatic hydrocarbons, including alkyl derivatives (e.g., 2-methoxyphenol, 4-ethoxyphenol, 2-methoxy-3-methylphenol, 2,6-dimethoxyphenol, 2-allyloxyxylenol, etc.); aryloxy hydroxylated aromatic hydrocarbons (e.g., 4-hydroxydiphenyl ether, 4-phenoxy-α-naphthol, etc.); side chain and nuclearly halogenated aliphatic and aromatic ethers of aromatic hydrocarbons (e.g., 2',6'-dichlorophenoxyphenol, 2,6,2',6'-tetrachlorophenoxyphenol, 4-methoxy-3,5-dichlorophenol, 4-chloro-2-methoxyphenol, trichloromethoxyphenol, 2-chloromethylphenol, etc.); cyanohydroxylated aromatic compounds (e.g., 2-cyanophenol, β-cyanonaphthol, 2-cyano-6-chlorophenol, etc.); carboxy hydroxylated aromatic compounds (e.g., 2-carboxy phenol, 4-carboxy-3-methylphenol, 2,3,5,6-tetrachloro-4-carboxyphenol etc.), polyhydroxylated aromatic compositions (e.g., hydroquinone, pyrogallol, resorcinol, bis(4-hydroxyphenyl)2,2-propane, tetrachlorohydroquine, 3,3',5,5'-tetra-t-butyl-4,4'-biphenol, 4,4'-biphenol, etc.), etc.

The ratio of the ingredients employed in my process can be varied widely. Thus, the molar ratio of the perfluorinated aliphatic aliphatic acid anhydride to the metal nitrate or ammonium nitrate can be between about 25 to 1 and 1 to 25. The molar ratio of the ammonium nitrate or the metal nitrate to the hydroxylated aromatic compound can also be varied widely and advantageously is between about 15 to 1 and 1 to 15, while the molar ratio of the perfluorinated aliphatic acid anhydride to the hydroxylated aromatic compound is between about 25 to 1 and 1 to 50. Preferably, the molar ratio of the perfluorinated acid anhydride to the ammonium nitrate or the metal nitrate is between about 5 to 1 and 1 to 5; the molar ratio of the ammonium nitrate or metal nitrate to the hydroxylated aromatic compound is between about 3 to 1 and 1 to 8; and the molar ratio of the perfluorinated aliphatic acid anhydride to the hydroxylated aromatic compound is between about 1 to 3 and 10 to 1. Generally there should be present at least 1 mol of the anhydride per mol of the nitrate.

The temperature of the reaction can be also varied widely, but it has been found that temperatures between about −10°

C. to about 50°C. or higher are adequate for the purpose. In determining the conditions of reaction, attention should be directed to the boiling points of the ingredients, and the possible necessity for pressure conditions, which can be employed if desired. Generally, ambient or room temperatures are sufficient thereby permitting operation of the process at temperatures ranging from about 20° to 35° C. without the necessity for applying any heat. Since the reaction is somewhat exothermic, any additional heat which may be needed for accelerating the reaction can be derived from the exothermic conditions which will result. Generally temperatures above about 100° C. should be avoided in order to avoid losses due to the formation of undesirable reaction products.

The reaction is advantageously carried out in a solvent which is inert to the reactants and to the reaction products. Included among such solvents may be mentioned aliphatic hydrocarbons, chlorinated aliphatic hydrocarbons and strongly deactivated aromatic compounds such as nitrobenzene, benzene sulfonic acid, etc. Specific compositions which may be employed for the purpose include chloroform, methylene chloride, acetonitrile, tetrachloroethane, hexane, ethylene dichloride, diethyl ether, dioxane, tetrahydrofuran, etc. If desired, the solvent can be the excess perfluorinated aliphatic acid anhydride over and above that necessary to give the desired oxidizing effect. The concentration of solvent is not critical and can be varied widely.

In carrying out the reaction, it is generally desirable to combine the inorganic nitrate with the hydroxylated aromatic composition, the perfluorinated aliphatic acid anhydride, and the solvent and then to stir the reaction mixture for a period of from a few minutes to about 4 to 5 hours or more until the reaction is completed. The presence of a reflux condenser to take care of the more volatile products formed during the reaction is often desirable. Thereafter, the reaction products are recovered from the reaction mixture by usual means, such as removing the volatile reaction compositions and by-products, as excess perfluoro aliphatic acid anhydride, any perfluoro aliphatic acid which may be formed, solvent, and by-products, such as $NO_2$, etc. Vacuum or slight heat to effect fractional distillation is often employed in this instance. Thereafter, the remaining mixture is advantageously mixed with water and the desired oxidized product may be removed by filtration or by extraction with a solvent in which the desired reaction product is soluble, depending on whether the product is a solid or liquid.

The oxidized compositions obtained in the practice of the present invention have many uses. Many of the oxidized products can be used as oxidants for other compositions, as dyestuffs, developers in photography, as monomers for making polymeric compositions, and as chemical indicators. Additionally the oxidized products (which contain the quinoid structure) can also be used as dehydrogenation agents.

In order that those skilled in the art can better understand how the present invention may be practiced, the following examples are given by way of illustration and not by way of limitation. All parts are by weight unless otherwise indicated. In the following examples, the percent yield found for the different reactions is calculated on the basis of the inorganic salt used and generally can be related to the following ratio:

Percent yield =
$$\frac{\text{Equivalents of oxidized product formed}}{\text{Equivalents of nitrate charged}}$$

EXAMPLE 1

Into a reaction vessel equipped with stirrer, thermometer, reflux condenser and drying tube were placed 26.6 grams (0.1 mol) pentachlorophenol, 8 grams (0.1 mol) ammonium nitrate, and 300 ml. methylene chloride. To this mixture was added 28 ml. (0.13 mol) trifluoroacetic anhydride (TFAA), and the entire mixture was stirred for about four hours at ambient temperature (about 25°–30° C.). All this time the reaction vessel was cooled with water to maintain a constant temperature. The reaction mixture was filtered to remove impure p-chloranil; the solvent was removed from the filtrate by means of a rotary evaporator. The solid which thus remained was dissolved in hot cyclohexane, filtered, and allowed to crystallize to give 19.74 grams o-chloranil in about an 80 percent yield. Further work up to the impure p-chloranil mentioned above gave an 8.5 percent yield of pure p-chloranil. The identity of the o-chloranil was established by the following analyses:

|       | Found | Theoretical |
|-------|-------|-------------|
| % C   | 29.16 | 29.27       |
| % Cl  | 57.55 | 57.72       |
| % O   | 13.29 | 13.01       |

EXAMPLE 2

In this example, employing the same equipment as in Example 1, 2.06 grams (0.01 mol) 2,6-di-tertiary butyl-phenol, 0.8 gram (0.01 mol) ammonium nitrate, 10 ml. $CHCl_3$ and 5 ml. (0.035 mol) TFAA were mixed together for about one hour at ambient temperatures. At the end of this time, the ammonium nitrate had dissolved and the reaction appeared to be completed. The solvent was removed by means of a rotary evaporator leaving a solid which upon recrystallization from glacial acetic acid gave 0.84 gram (about 83 percent yield) 3,3'5,5'241° C.

EXAMPLE 3

Employing the same equipment as in the preceding examples, 2.47 grams (0.01 mol) 2,3,5,6-tetrachlorohydroquinone and 0.80 gram (0.01 mol) ammonium nitrate were charged to the reaction vessel. Thereafter 20 ml. $CHCl_3$ and 5 ml. (0.035 mol) TFAA were added and the reaction mixture was stirred and allowed to proceed at room temperature. After about one hour at temperatures ranging from about 30° to 40° C., a yellow precipitate was obtained which was impure p-chloranil. The excess solvent was removed by distillation and the precipitate was washed with 100 ml. water and filtered. The solid, filtered product was dried for about 18 hours in vacuum to give what was identified as essentially pure p-chloranil melting at 291° C. in a yield of about 98 percent. The identification of the product was further established by the following analyses:

|       | Calculated | Found |
|-------|------------|-------|
| % C   | 29.27      | 29.4  |
| % Cl  | 57.72      | 56.8  |
| % O   | 13.01      | 13.8  |

EXAMPLE 4

Employing the equipment used in the preceding examples, 3.08 grams (0.02 mol) 2,6-dimethoxyphenol, 3.2 grams (0.04 mol) ammonium nitrate, and 50 ml. glacial acetic acid were added to the reaction flask and the mixture was stirred at around room temperature during which time 10 ml. (0.07 mol) TFAA was added. Immediate reaction ensued as evidenced by the fact that the purple diphenoquinone began to precipitate. After about one hour of stirring during which the temperature rose to about 35° to 40° C., the product was filtered and the solid precipitate was washed with water and dried in the same manner as in Example 3 to yield 1.26 grams (41.4 percent yield) 3,3',5,5' tetramethoxydiphenoquinone having a melting point of 291°–293° C. The identity of the product was further established by the following analyses:

|      | Calculated | Found |
|------|------------|-------|
| % C  | 63.15      | 63.5  |
| % H  | 5.30       | 5.49  |
| % O  | 31.55      | 31.0  |

EXAMPLE 5

Employing the same equipment as in the previous examples, 4.12 grams (0.02 mol) 2,6-di-t-butylphenol, 6.62 grams (0.02 mol) Pb(NO$_3$)$_2$, 50 ml. acetone and 10 ml. (0.04 mol) TFAA were added to the reaction vessel. When stirring was initiated, there was a rapid evolution of heat and the reaction mixture became a deep yellow-red. After 2.5 hours of stirring, an additional 10 ml. TFAA was added and the reaction allowed to continue for about one half hour longer. The solid material thus obtained was filtered, washed with water, and dried in the same manner as in the preceding examples to yield 1.84 grams (45.1 percent yield) 3,3',5,5' melting at 240°–242° C.

EXAMPLE 6

When the procedure recited in Example 5 was repeated in all respects with the exception that the Pb(NO$_3$)$_2$ was replaced with 2.38 grams (0.02 mol) AgNO$_3$, there was obtained 2.56 grams (62.7 percent yield) 3,3',5,5'diphenoquinone.

EXAMPLE 7

Employing the same conditions as in Example 5, the lead nitrate was replaced with 1.70 grams (0.02 mol) NaNO$_3$, thereby yielding 1.74 grams (83 percent yield) of 3,3'5,5'-tetra-t-butyldiphenoquinone.

It will of course be apparent to those skilled in the art that other hydroxylated aromatic compounds can be oxidized in accordance with the present invention and the particular nitrate and perfluoro aliphatic acid can be varied widely without departing from the scope of the invention. Additionally, the molar concentrations of the hydroxylated aromatic compound, the nitrate, and the perfluorinated aliphatic acid anhydride can be varied widely and are not critical as long as there is present a sufficient amount of the perfluorinated aliphatic acid anhydride to react with the inorganic nitrate to form the perfluoro aliphatic acid nitrate which is required for oxidation purposes.

What I claim as new and desire to secure by Letters Patent of the United States is:

1. The process for oxidizing a hydroxylated aromatic compound selected from the class consisting of mono and poly hydroxylated hydrocarbon phenols and nuclear substituted mono and poly hydoxylated hydrocarbon phenols wherein the substituents are selected from the group consisting of : halogen, lower alkyl, allyl, lower alkoxy, halogenated lower alkoxy, phenoxy, halogenated phenoxy, carboxy and cyano, which process comprises treating the said compound with a mixture of a perfluoro saturated aliphatic acid anhydride of from four to eight carbon atoms and a nitrate selected from the class consisting of sodium nitrate, potassium nitrate, copper nitrate, cadmium nitrate, lead nitrate, silver nitrate, zirconium nitrate, chromium nitrate and ammonium nitrate.

2. The process as in claim 1 wherein the nitrating agent is ammonium nitrate.

3. The process as in claim 1 wherein the nitrate is sodium nitrate.

4. The process as in claim 1 wherein the nitrate is silver nitrate.

5. The process as in claim 1 wherein the perfluoro saturated aliphatic acid anhydride is trifluoro-acetic anhydride.

6. The process as in claim 1 wherein the hydroxylated aromatic compound is 2,6-di-t-butylphenol.

7. The process as in claim 1 wherein the hydroxylated aromatic compound is pentachlorophenol.

8. The process as in claim 7 wherein the perfluoro saturated aliphatic acid anhydride is trifluoroacetic anhydride.

9. The process as in claim 7 wherein the nitrate is ammonium nitrate.

10. The process as in claim 7 wherein the perfluoro saturated aliphatic acid anhydride is trifluoroacetic anhydride and the nitrate is ammonium nitrate.

11. The process for making chloranil which comprises treating 2,3,5,6-tetrachlorohydroquinone with a mixture of a perfluoro saturated aliphatic acid anhydride of from four to eight carbon atoms and a nitrate selected from the class consisting of ammonium nitrate, sodium nitrate, potassium nitrate, copper nitrate, cadmium nitrate, lead nitrate, silver nitrate, zirconium nitrate, and chromium nitrate.

* * * * *